United States Patent
Carron

(10) Patent No.: US 12,263,051 B1
(45) Date of Patent: Apr. 1, 2025

(54) PROPHYLAXIS TOOL HANDPIECE

(71) Applicant: Avid, Inc., Bloomsdale, MO (US)

(72) Inventor: Chris J. Carron, Bloomsdale, MO (US)

(73) Assignee: Avid, Inc., Bloomsdale, MO (US)

( * ) Notice: Subject to any disclaimer, the term of this patent is extended or adjusted under 35 U.S.C. 154(b) by 846 days.

(21) Appl. No.: 16/810,048

(22) Filed: Mar. 5, 2020

Related U.S. Application Data

(60) Provisional application No. 62/815,769, filed on Mar. 8, 2019.

(51) Int. Cl.
| | |
|---|---|
| *A61C 17/022* | (2006.01) |
| *A61C 1/05* | (2006.01) |
| *A61C 1/14* | (2006.01) |
| *A61C 17/00* | (2006.01) |
| *A61C 17/02* | (2006.01) |
| *A61C 17/16* | (2006.01) |

(52) U.S. Cl.
CPC ............ *A61C 17/005* (2013.01); *A61C 1/055* (2013.01); *A61C 1/144* (2013.01); *A61C 17/0202* (2013.01); *A61C 17/022* (2013.01); *A61C 17/16* (2013.01)

(58) Field of Classification Search
CPC ..... A61C 17/005; A61C 17/225; A61C 1/052; A61C 1/18; A61C 1/10; A61C 1/12; A61C 1/16
USPC ......................................................... 433/126
See application file for complete search history.

(56) References Cited

U.S. PATENT DOCUMENTS

| | | | | |
|---|---|---|---|---|
| 4,403,958 A | * | 9/1983 | Lohn ........................ | A61C 1/05 433/126 |
| 4,661,060 A | * | 4/1987 | Strohmaier ............ | A61C 1/052 433/82 |
| 5,476,380 A | * | 12/1995 | Rosenstatter .......... | A61C 1/088 433/132 |
| 5,480,302 A | * | 1/1996 | Fife .......................... | A61C 1/16 433/104 |
| 9,526,589 B2 | * | 12/2016 | Bossler .................. | A61C 1/144 |
| 2007/0113374 A1 | * | 5/2007 | Joshi .................. | A46B 15/0002 15/405 |

(Continued)

FOREIGN PATENT DOCUMENTS

KR 20100096039 A * 9/2010

*Primary Examiner* — Cris L. Rodriguez
*Assistant Examiner* — Luis Ruiz Martin
(74) *Attorney, Agent, or Firm* — Husch Blackwel LLP

(57) ABSTRACT

A dental prophylaxis tool handpiece includes a motor section having a first connector; a sleeve section having a second connector with a first end extending over a portion of the motor section and engaging a prophylaxis tool at a second end; the first and second connector configured for engagement with each other and configured to limit relative axial movement of the sleeve section relative to the motor section while allowing for free rotational movement of the sleeve section relative to the motor section; and upon engagement of the sleeve section with the motor section, a portion of the motor portion is covered to substantially isolate the portion of the motor section from contaminants. Other embodiments incorporate a positive air pressure feature and/or an ozone generator. Associated methods of preventing contamination of at least a distal portion of a motor section of a prophylaxis tool handpiece are also described.

10 Claims, 16 Drawing Sheets

(56) References Cited

U.S. PATENT DOCUMENTS

2016/0081766 A1* 3/2016 Wilson .................... A61C 1/12
433/125

* cited by examiner

PROPHYLAXIS TOOL HANDPIECE

CROSS REFERENCE TO RELATED APPLICATIONS

This application is claims the benefit and priority of U.S. Provisional Patent Application Ser. No. 62/815,769 filed Mar. 8, 2019, the entire disclosure of which is hereby incorporated herein by reference.

TECHNICAL FIELD

The invention relates to a dental hygiene device. More specifically, the invention relates to a dental prophylaxis tool handpiece system.

BACKGROUND OF THE INVENTION

Dental hygiene tools, such as prophylaxis tools and handpieces for those tools, require regular sterilization between patient uses to kill bacteria, viruses and other contaminants that may have been deposited onto the items to prevent transferring those contaminants to dental hygienists or subsequent patients. Most handpieces in the industry are made as an assembly of components that cannot be disassembled. This makes it necessary to sterilize the entire handpiece, thus removing it from use for a period of time. The hygienist cannot use the handpiece on the next patient because the handpiece is in the sterilizer. This forces the dental office to purchase multiple costly handpieces in order to keep performing procedures on more patients.

SUMMARY OF THE INVENTION

This section provides a general summary of the disclosure, and is not a comprehensive disclosure of its full scope or all of its features.

According to one aspect of the present disclosure, there is provided a dental prophylaxis tool handpiece that includes a motor section having a first connector; a sleeve section having a second connector and at a first end extending over at least a portion of the motor section and further configured to engage a prophylaxis tool at a second end of the sleeve section; wherein the first and second connector are each configured for engagement with each other, such engagement being further configured to limit relative axial movement of the sleeve section relative to the motor section while allowing for free rotational movement of the sleeve section relative to the motor section; and wherein upon engagement of the sleeve section with the motor section, at least a portion of the motor portion is covered to substantially isolate the portion of the motor section from contaminants.

According to another aspect of the present disclosure, there is provided a dental prophylaxis tool handpiece that includes a motor section having a first connector; a sleeve section having a second connector and at a proximal end extending over at least a portion of a distal end of the motor section and further configured to engage a prophylaxis tool at a distal portion of the sleeve section; wherein the first and second connector are each configured for engagement with each other, such engagement being further configured to limit relative axial movement of the sleeve section relative to the motor section while allowing for free rotational movement of the sleeve section relative to the motor section; wherein upon engagement of the sleeve section with the motor section, at least a portion of the motor portion is covered to substantially isolate the portion of the motor section from contaminants; wherein the motor section and the sleeve section define an interior space therebetween, wherein the motor section includes an air driven motor having a rotor section and an air inlet in communication with a source of pressurized air; and wherein the motor section further includes an air passage in fluid communication with the rotor section and with the interior space and configured to provide a conduit for pressurized air to pass from the rotor section to the interior space and create a region of higher than atmospheric pressure within the interior space.

According to a further aspect of the present disclosure, there is provided a dental prophylaxis tool handpiece that includes a motor section having a first connector; a sleeve section having a second connector and at a proximal end extending over at least a portion of a distal end of the motor section and further configured to engage a prophylaxis tool at a distal portion of the sleeve section; wherein the first and second connector are each configured for engagement with each other, such engagement being further configured to limit relative axial movement of the sleeve section relative to the motor section while allowing for free rotational movement of the sleeve section relative to the motor section; wherein upon engagement of the sleeve section with the motor section, at least a portion of the motor portion is covered to substantially isolate the portion of the motor section from contaminants; wherein the motor section and the sleeve section define an interior space therebetween; wherein the motor section includes an air driven motor having a rotor section and an air inlet in communication with a source of pressurized air; wherein the motor section further includes an air passage in fluid communication with the rotor section and with the interior space and configured to provide a conduit for pressurized air to pass from the rotor section to the interior space and create a region of higher than atmospheric pressure within the interior space; and an ozone generator in fluid communication with pressurized air in the rotor section and with the interior space, the ozone generator configured to ionize pressurized air passing into the ozone generator.

According to yet another aspect of the present disclosure, there is provided a method of preventing contaminants from reaching at least a portion of a motor section of a dental prophylaxis tool handpiece that includes the steps of providing a first connector engaged with the motor section; a sleeve section having a second connector and extending over at least a portion of the motor section at a first end and further configured to engage a prophylaxis tool at a second end of the sleeve section; wherein the first and second connector are each configured for engagement with each other, such engagement being further configured to limit relative axial movement of the sleeve section relative to the motor section while allowing for free rotational movement of the sleeve section relative to the motor section; and wherein said engagement of the sleeve section with the motor section is further configured to substantially isolate at least a portion of the motor section from contaminants; axially aligning the sleeve section with the motor section and sliding the sleeve section onto the motor section; and engaging the first connector with the second connecter, thereby axially limiting relative movement between the sleeve section and the motor section while allowing relative rotational movement.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Figure 1:
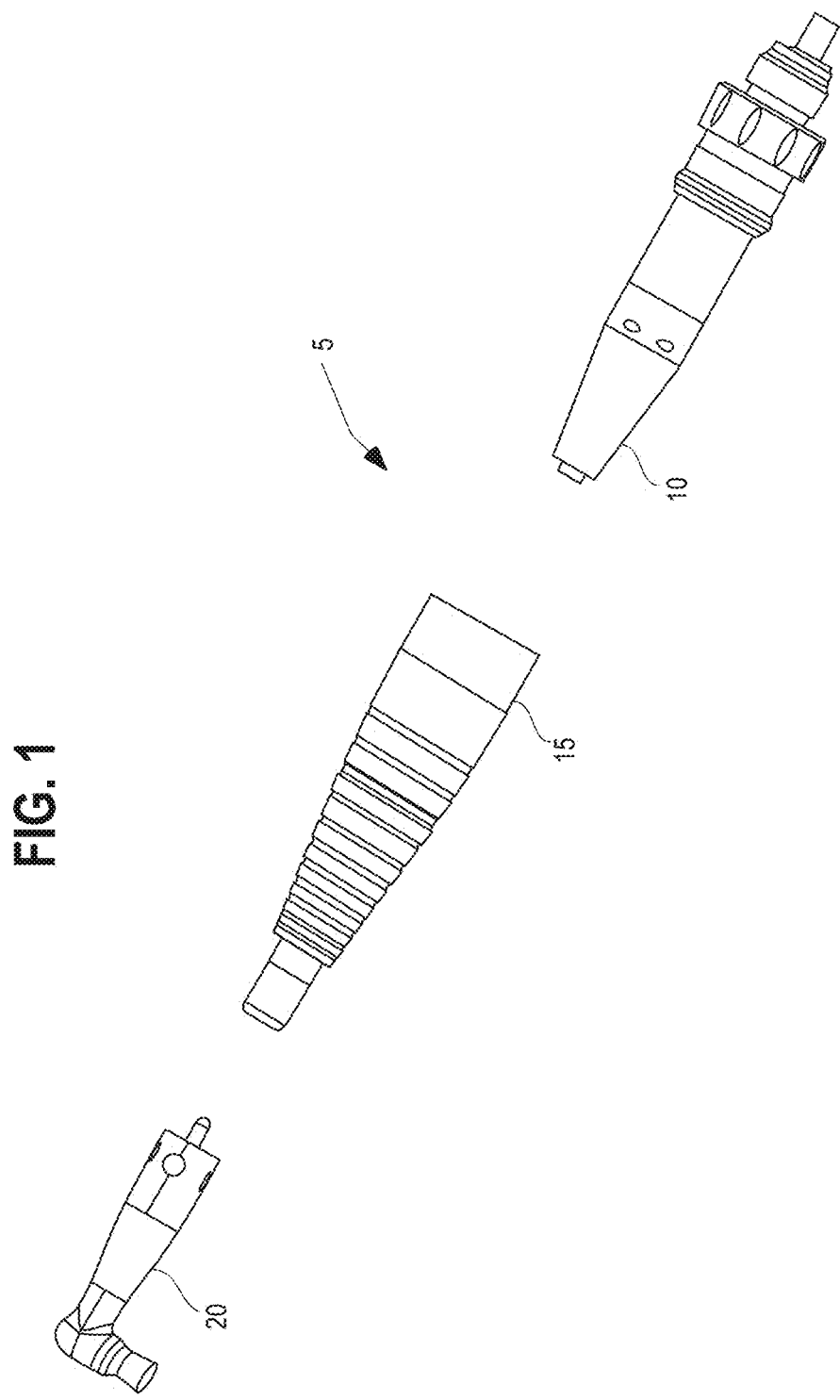
FIG. 1 is an exploded elevation view of a prophylaxis tool handpiece according to one embodiment of the present disclosure.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Example embodiments are provided so this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The methods, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
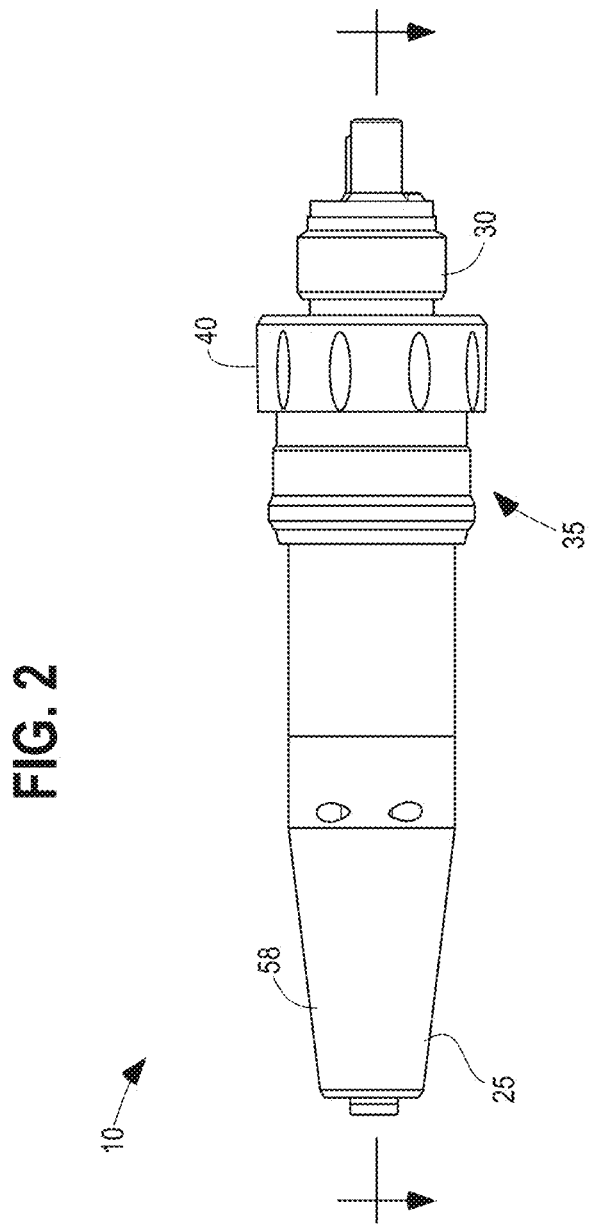
FIG. 2 is an elevation view of a motor section for the prophylaxis tool handpiece of FIG. 1.
Figure 3:
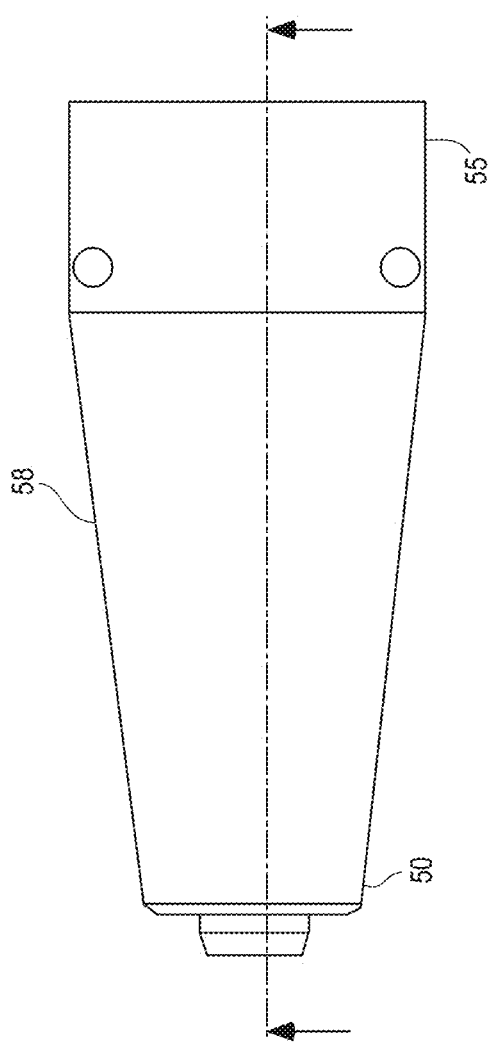
FIG. 3 is an elevation view of housing for the motor section of FIG. 2.
Figure 4:
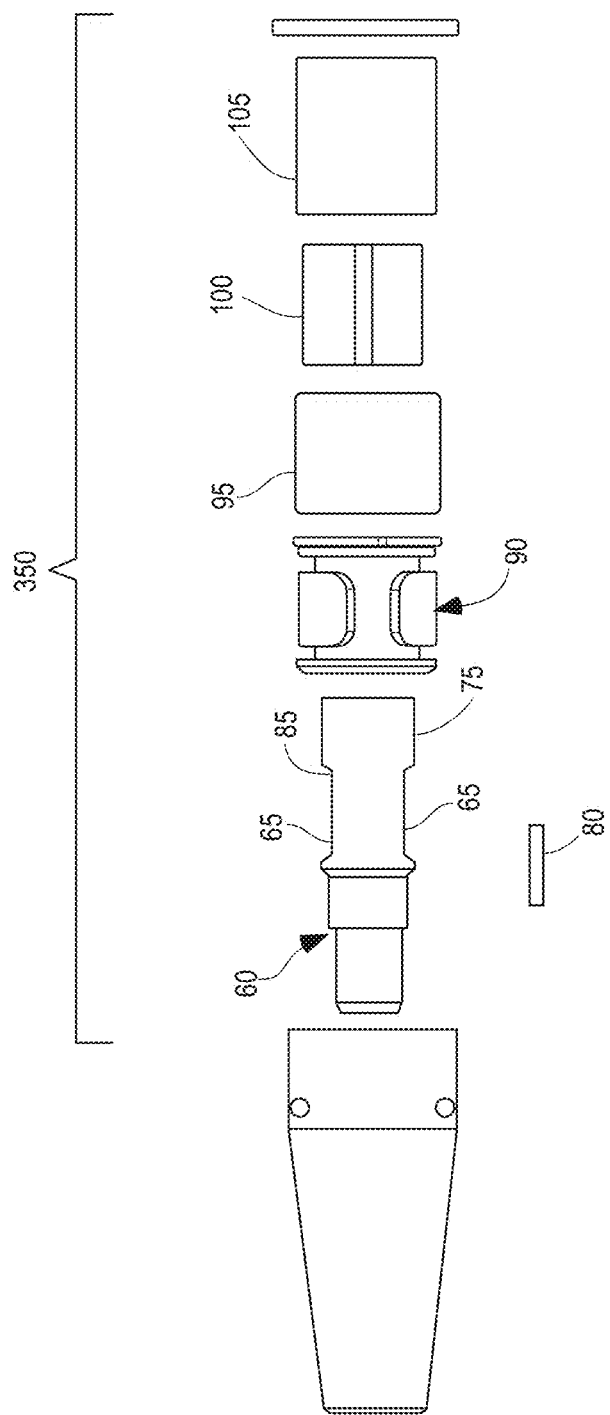
FIG. 4 is an exploded view of a motor section for a prophylaxis handpiece incorporating an ozone generator according to another embodiment of the present disclosure.
Figure 5:
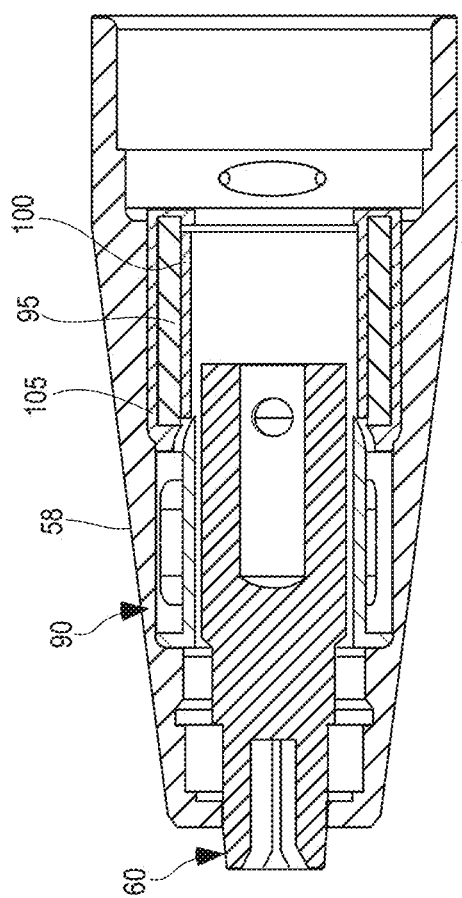
FIG. 5 is a cross sectional view of the motor section and ozone generator of FIG. 4.

As illustrated in FIG. 1, a prophylaxis tool handpiece 5 includes motor section 10, a sleeve section 15, and a prophylaxis tool section 20. The motor section 10 is illustrated in FIG. 2 and includes a first motor end 25 and a second motor end 30 and a housing housing 58 which may be made from a high temperature plastic such as polyether ether ketone (PEEK) or a polyamide such as DuPont® Vespel®, but may be made from other materials in alternative embodiments. The motor section 10 is shaped and sized so that the sleeve section 15 can selectively engage with the motor section 10, as will be explained in more detail hereinafter. The motor section 10 may include an air motor that is connected with and powered by a source of pressurized air. In alternative embodiments, the motor section 10 can be an electric battery powered motor.

Figure 6:
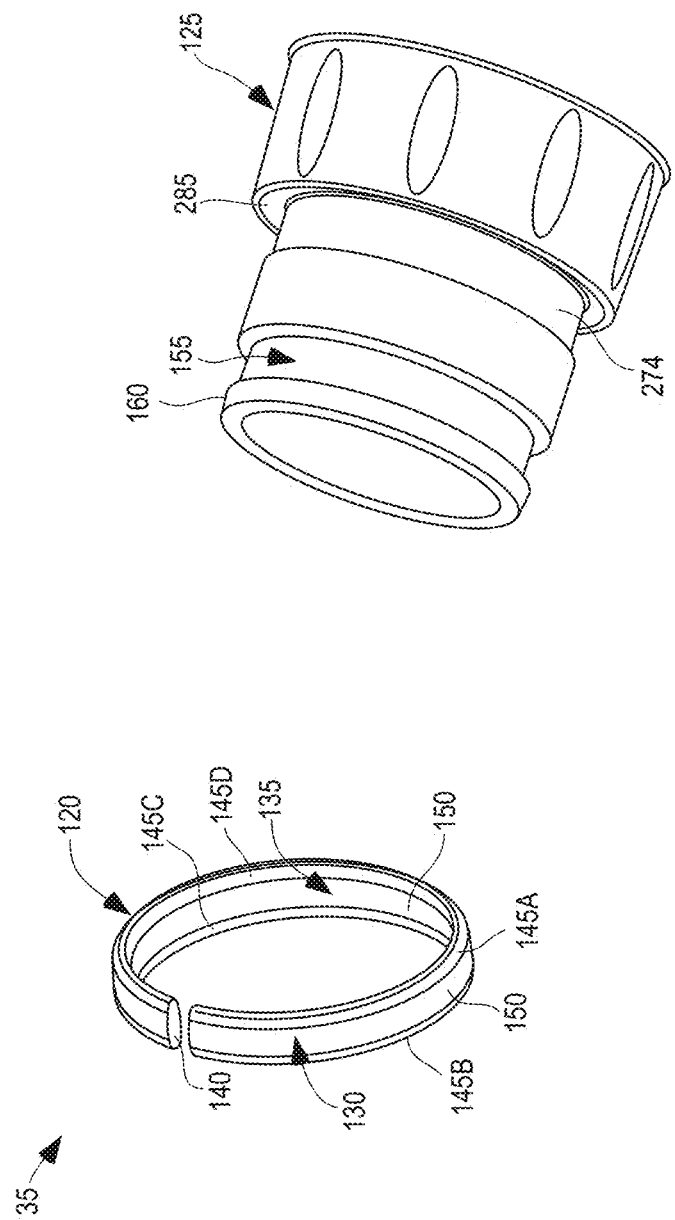
FIG. 6 is an exploded view of a clamp sleeve and split ring suitable for connecting a motor section and a sleeve section according to an embodiment of the present disclosure.
Figure 7:
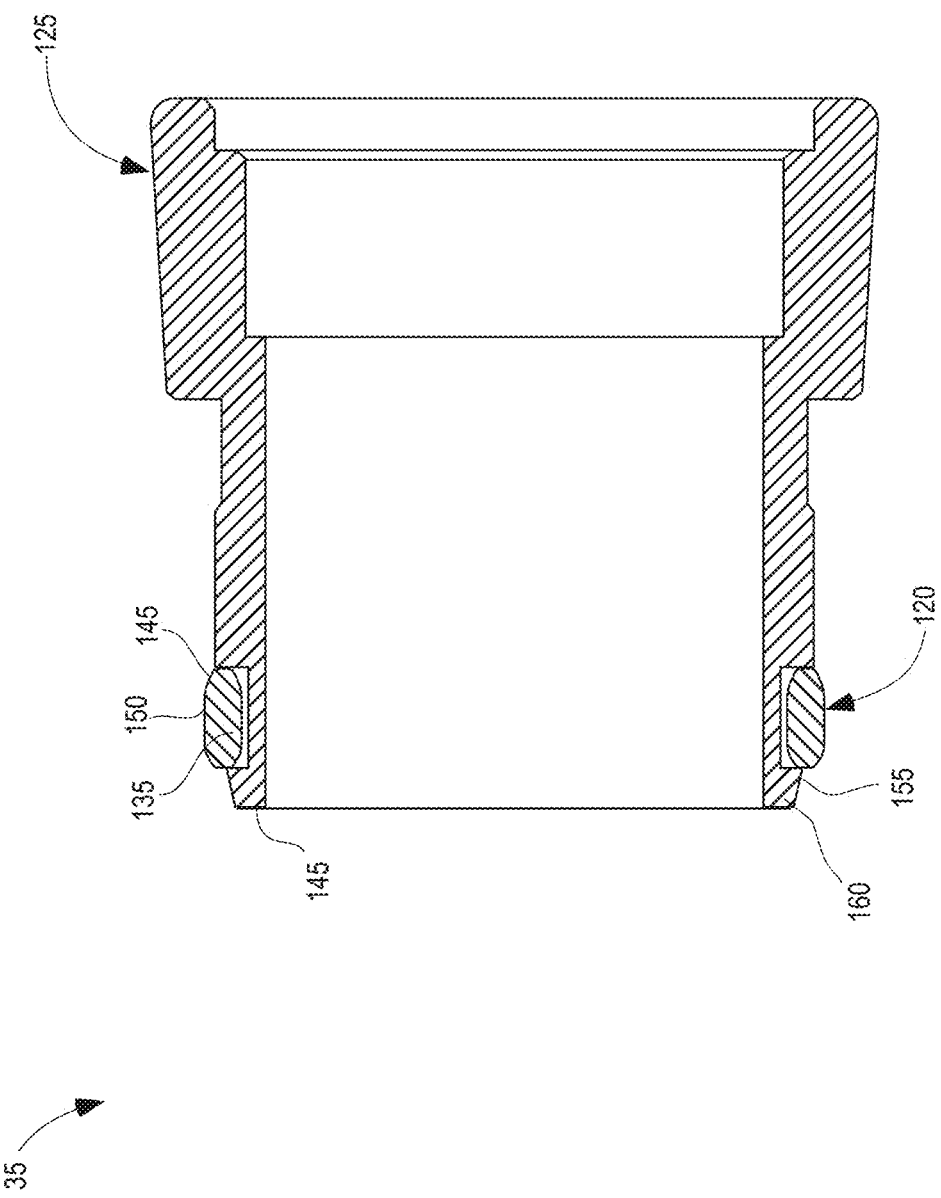
FIG. 7 is a cross sectional view of the clamp sleeve and split ring of FIG. 6.

The motor section 10 may further include a connector 35 as shown in FIG. 6. The connector 35 may be assembled and engage the motor section 10 thereby allowing the sleeve section 15 to selectively engage the motor section 10. The connector 35 may be removably or permanently connected with or to the motor section 10. The connector 35 includes a split ring 120 and a clamp sleeve 125 illustrated in FIGS. 6 and 7. The split ring 120 is preferably made out of a wear resistant material and is preferably an annular ring with an outer ring surface 130 and an inner ring surface 135. The split ring 120 further includes an opening or break 140 extending through the split ring 120. The split ring 120 further includes two tapered ring surfaces 145A and 145B on the upper and lower portions of the outer ring surface 130 and 145C and 145D on the upper and lower portions of the inner ring surface 135 (collectively referenced as 145). The tapered ring surfaces 145 on the inner ring surface 135 and outer ring surface 130 taper inwards, towards each other, so that the thickness of a middle ring section 150 is greater than the thickness of the tapered ring surfaces 145.

The split ring 120 is configured to allow for a limited range of contraction and expansion of the split ring's 120 diameter in order to facilitate sliding the split ring 120 over structures with an outer diameter that is slightly larger than the split ring's 120 inner diameter and sliding the split ring 120 within structures with an inner diameter that is slightly smaller than the split ring's 120 outer diameter while providing the split ring 120 with a spring-like tendency to return to its nominal diameter in the absence of such external forces.

The split ring 120 is sized and shaped to fit within a clamp sleeve groove 155 of the clamp sleeve 125. In more detail, the inner diameter of the split ring 120 is preferably slightly larger than the outer diameter of the clamp sleeve groove 155. A tapered clamp sleeve lip 160 has a larger outer diameter than both the inner diameter of the split ring 120 and the clamp sleeve groove 155. The tapered ring surfaces 145 allow the split ring 120 to more easily slide onto the clamp sleeve 125, wherein the opening 140 of the split ring 120 allows the split ring 120 to expand and slide over the tapered clamp sleeve groove surface 160 of the clamp sleeve 125 until the split ring 120 slides into the clamp sleeve groove 155. Once the split ring 120 is within the clamp sleeve groove 155, the split ring 120 returns to its previous shape.

Figure 8:
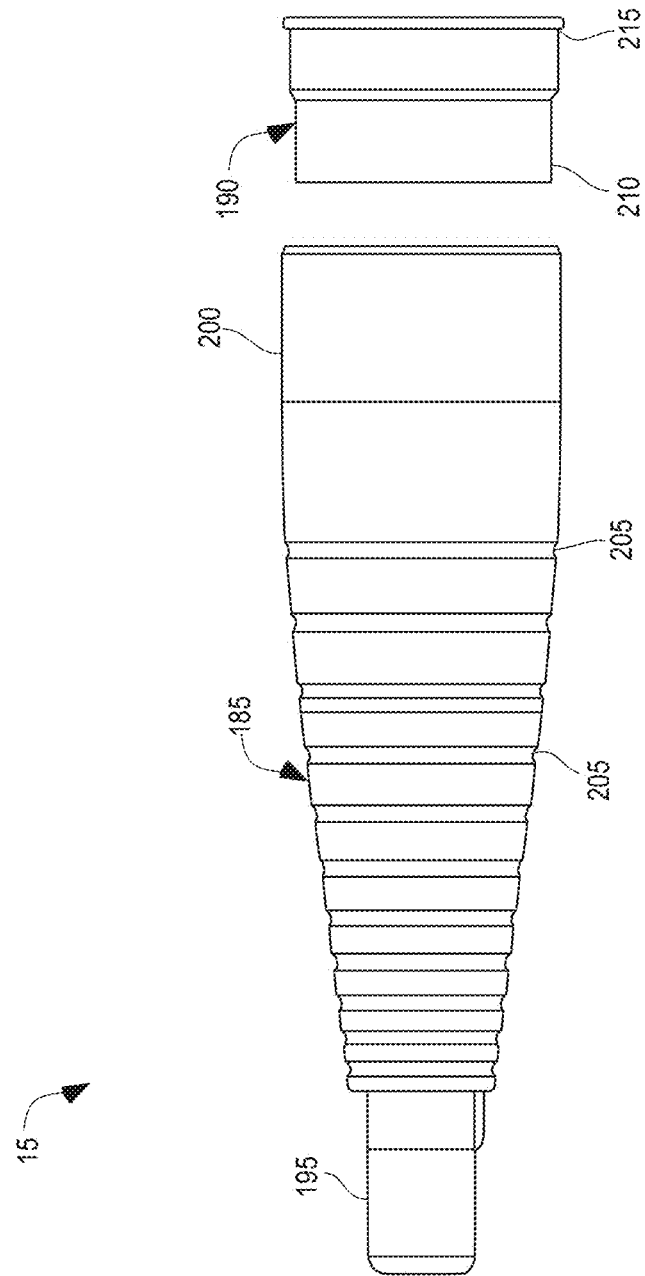
FIG. 8 is an exploded elevation view of a sleeve section suitable for use in a prophylaxis tool handpiece according to an embodiment of the present disclosure.
Figure 9:
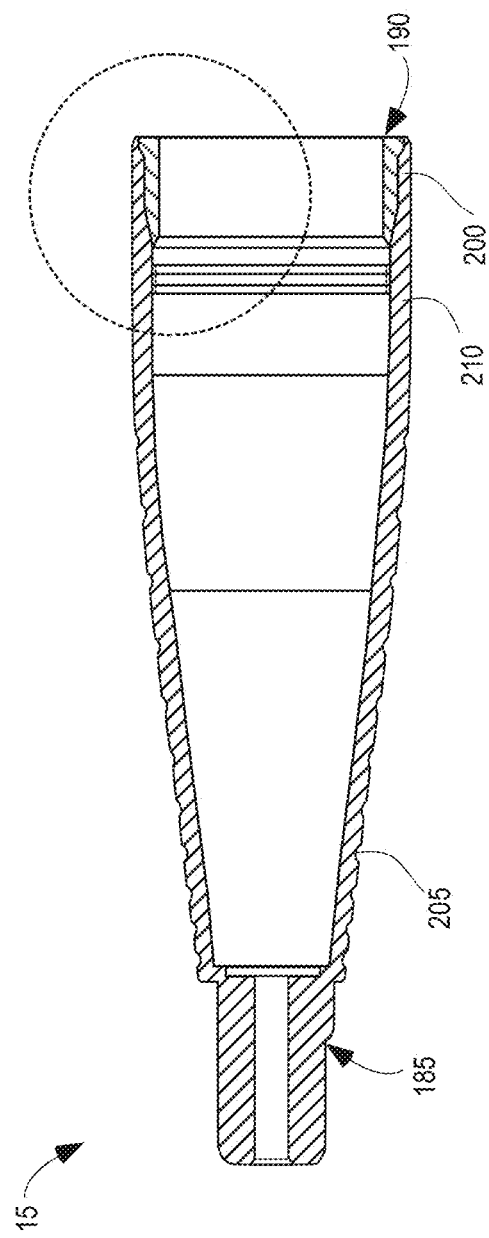
FIG. 9 is a cross sectional view of the sleeve section of FIG. 8.

The motor section 10 and the sleeve section 15 are configured to selectively engage one another. In one embodiment, the sleeve section 15 includes an outer sleeve portion 185 and an inner sleeve portion 190, as illustrated in FIGS. 8 and 9. The outer sleeve portion 185 may be a hollow cylindrical member, with a first outer sleeve end 195 and a second outer sleeve end 200. The outer sleeve portion 185 preferably tapers gradually inwardly at its first outer sleeve end 195. The outer sleeve portion 185 may further include a series of sleeve grooves 205 so that it is easier for a user to grip the sleeve section 15.

The diameter at the first outer sleeve end 195 is shaped and sized so that the sleeve section 15 can engage the prophylaxis tool 20. The second outer sleeve end 200 is shaped and sized so that the second outer sleeve end 200 of the outer sleeve portion 185 can engage with a first inner sleeve end 210 of the inner sleeve portion 190. The inner sleeve portion 190 also includes a second inner sleeve end 215.

Figure 10:
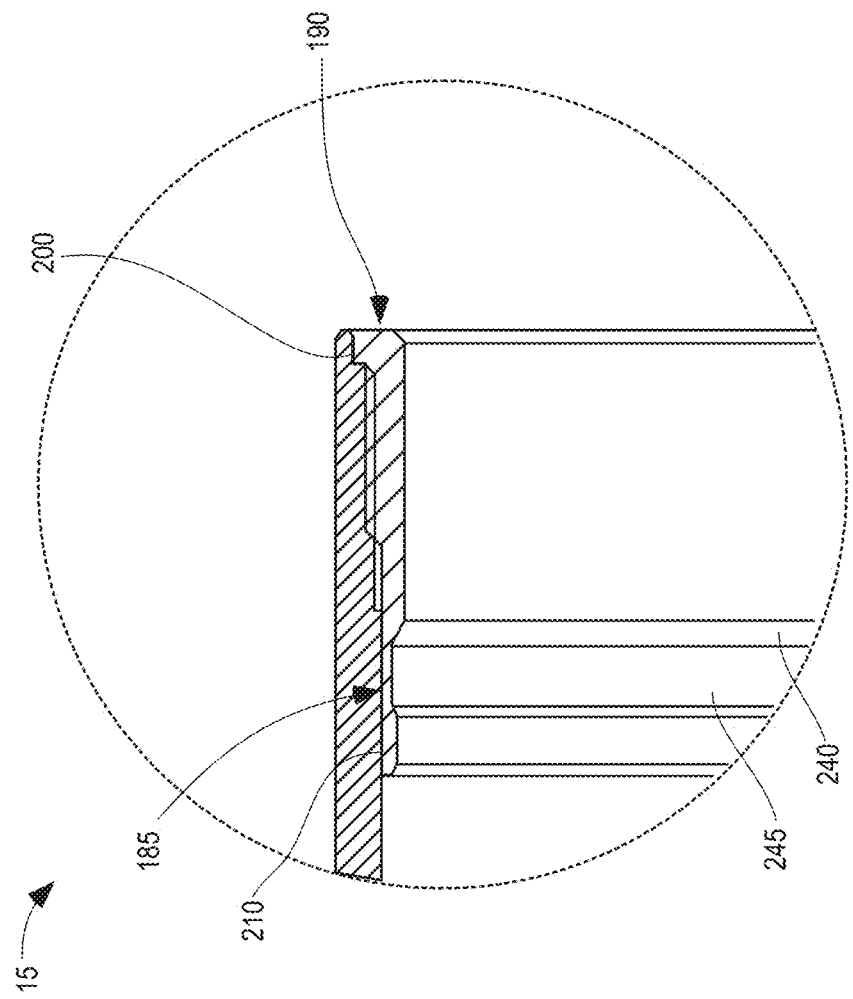
FIG. 10 is an enlarged view of one end of the sleeve section of FIGS. 8 and 9.

The inner sleeve portion 190 is provided with an internal groove 245 having a height that corresponds to the height of the split ring 120. A tapered surface 240 is provided at least axially below the internal groove 245 to facilitate entry of the split ring 120 into the internal groove as described further herein. Turning to FIGS. 9 and 10, the inner sleeve portion 190 may therefore be inserted into the outer sleeve portion 185. In one embodiment, the interior of the outer sleeve portion 185 is provided with female screw threads which engage male screw threads on the exterior of the inner sleeve portion 190 to allow the two pieces to be securely connected to one another by the resulting threaded engagement. The outer sleeve portion 185 and inner sleeve portion 190 may also be connected by a friction engagement, adhesive, or any other suitable construction. In other embodiments, the two pieces may be integrated into a single structure. In this latter case, the interior features of the inner sleeve portion 190 are directly incorporated in the interior of the second sleeve end 200.

The outer sleeve portion 185 and inner sleeve portion 190 may be made from any suitable materials, although such materials may preferably be selected for their ability to be sterilized repeatedly and for wear resistance. In some embodiments, the outer sleeve portion 185 may be made out of aluminum, while the inner sleeve portion 190 may be made out stainless steel. The inner sleeve 190 is preferably created out of a wear resistant material. In alternative embodiments, the outer sleeve portion 185 and inner sleeve portion 190 may be constructed out of other materials, such as titanium.

The inner sleeve portion 190 also allows the sleeve section 15 to selectively engage the connector 35. In order to selectively engage the sleeve section 15 and the motor section 10, the first motor end 25 may be inserted into the second inner sleeve end 215 of the inner sleeve portion 190 engaged with the outer sleeve portion 185. The sleeve section 15 may slide onto the motor section 10, where the outer diameter of the inner sleeve portion 190 is slightly larger than the diameter of the connector 35 so that the sleeve section 15 may fit over the second motor end 30. When the sleeve section 15 is slid onto the motor section 10, the resulting engagement of the split ring 120 into the internal groove 220 of the inner sleeve portion 190 selectively secures the two pieces together. The resulting engagement allows for free rotation of the two pieces relative to one another while maintaining a secure engagement. Further, upon application of sufficient axial force, the two pieces may be selectively pulled apart due to the action of the angled surfaces on the various components as discussed above, allowing the pieces to be individually sterilized or allowing the sleeve section 15 to be replaced with another, already sterilized, sleeve section for continued use of the device with minimal interruption. As noted above, the sleeve section 15 is further configured to selectively engage the prophylaxis tool 20, which is preferably either sterilizable (and reusable) or disposable. When the sleeve section 15 is placed over the motor portion 10, the sleeve portion minimizes or prevents the intrusion of debris, saliva, bacteria, or fungi into the interior space of the sleeve section 15 into which the motor section 10 is inserted.

In an alternate embodiment wherein the motor is an air motor, the system further includes a mechanism for introducing positive air pressure into the interior of the sleeve section 15. In doing so, intrusion of various contaminants into the interior of the sleeve section 15 is further discouraged as the flow of such materials, in addition to bypassing the physical barrier created by the sleeve section 15, must overcome the greater pressure contained within the sleeve. FIGS. 13-16 further illustrate an embodiment of the positive air pressure feature. More particularly, the motor section 10 is provided with a rotor cartridge 300 that houses a rotor 302 comprised of a series of vanes 304 connected to a drive shaft 306. An air inlet 308 conducts pressurized air from a source into the interior of the rotor cartridge 300 where it impacts against and drives the vanes 304 to move the rotor 302 and the drive shaft 306. An end seal 310 is located at the distal end of the rotor cartridge 300 to seal the interior of the rotor cartridge 300. The end seal 310 also retains a bearing 312 through which the distal end of the drive shaft 306 extends and passes out of the rotor cartridge 300 interior. The rotor cartridge 300 is also provided with an outlet side, distant from the inlet side, with an exhaust port 314 to allow for air to flow through the interior of the rotor cartridge 300.

There is provided an air passage 316 passing through the end seal 310 that connects the interior of the rotor cartridge 300 with the exterior of the motor section 10 and with the interior of the sleeve section 15 which defines a generally closed interior space. The air passage 316 allows for a limited stream of pressurized air to pass out of the rotor cartridge 300 interior—without compromising the functioning of the air motor—and into the interior space of the sleeve section 15. As described above, the resulting continuous flow of pressurized air into the interior space between the sleeve section 15 and motor section 10 creates a region of slightly higher pressure within that interior space relative to atmospheric pressure outside of the sleeve section 15. This pressure differential forms an opposing force to the potential flow of air contaminated with bacteria, viruses, or other contaminants from entering the interior of the sleeve section, thereby further minimizing contamination of the motor section 10.

Figure 11:
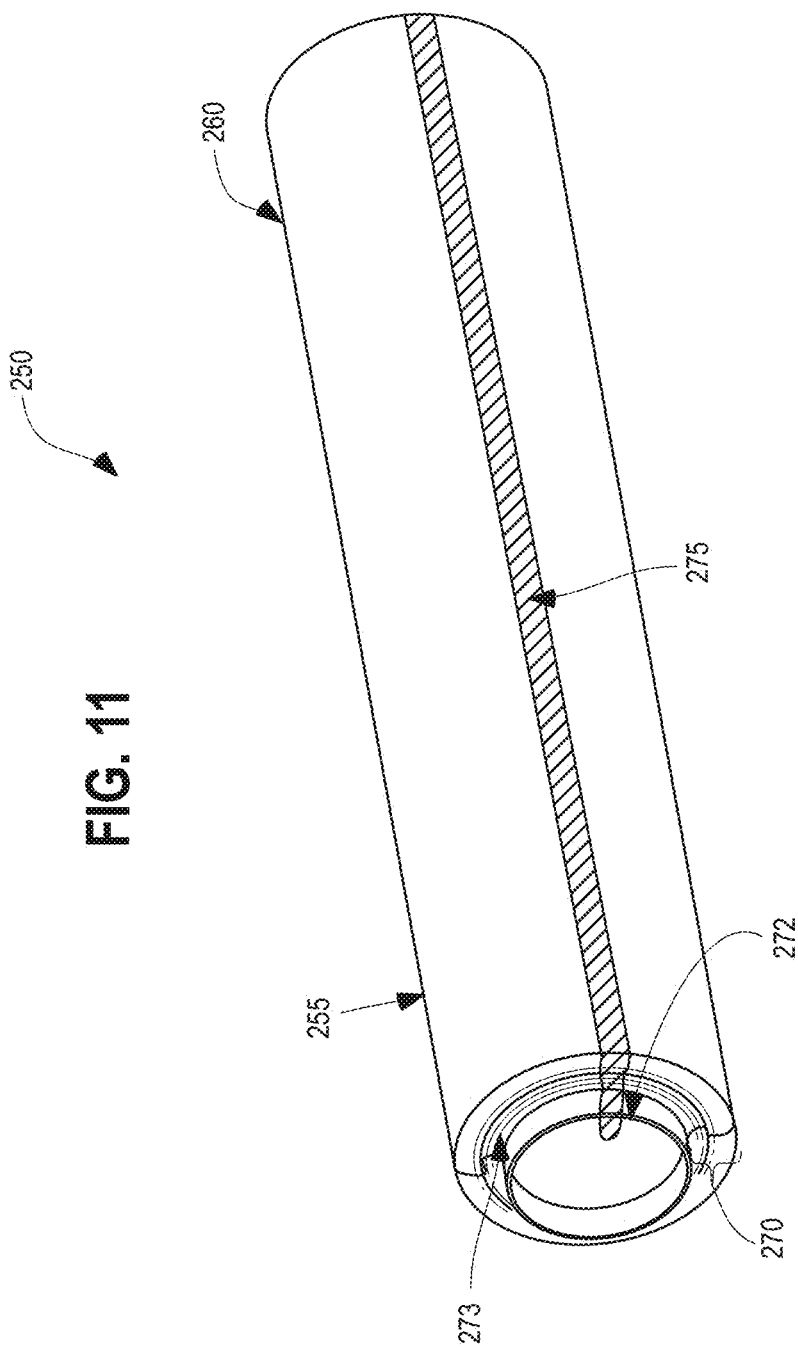
FIG. 11 is a perspective view of a barrier sleeve suitable for use in a prophylaxis tool handpiece according to an embodiment of the present disclosure.
Figure 12:
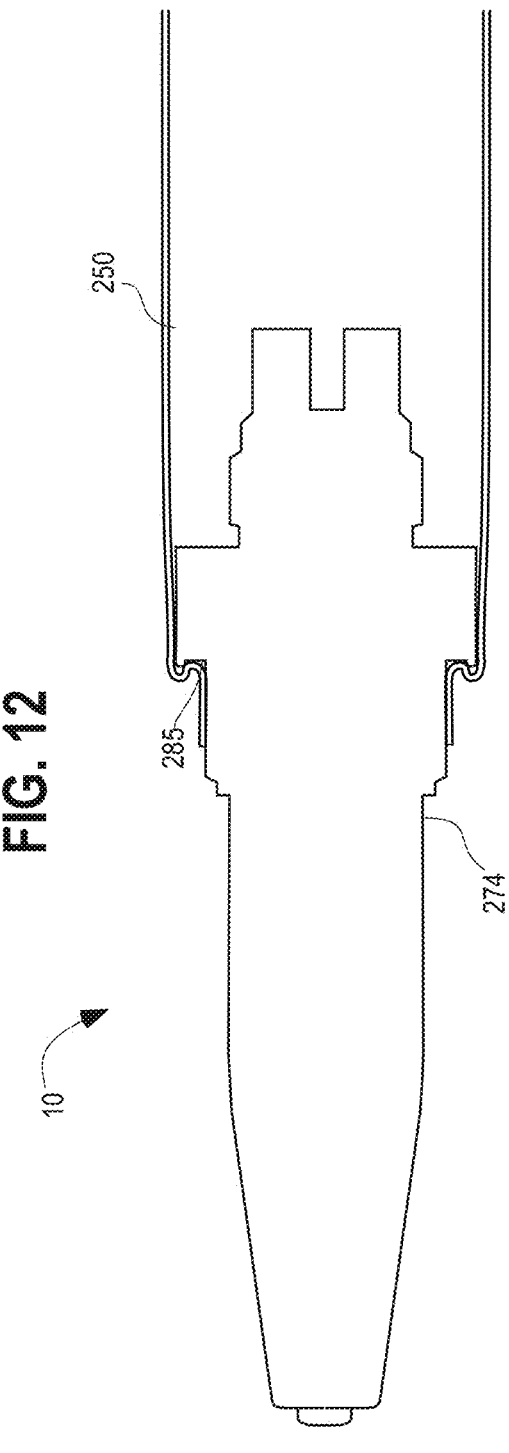
FIG. 12 is a cross sectional view of the motor section and the barrier sleeve of FIG. 11 engaged with one another.
Figure 13:
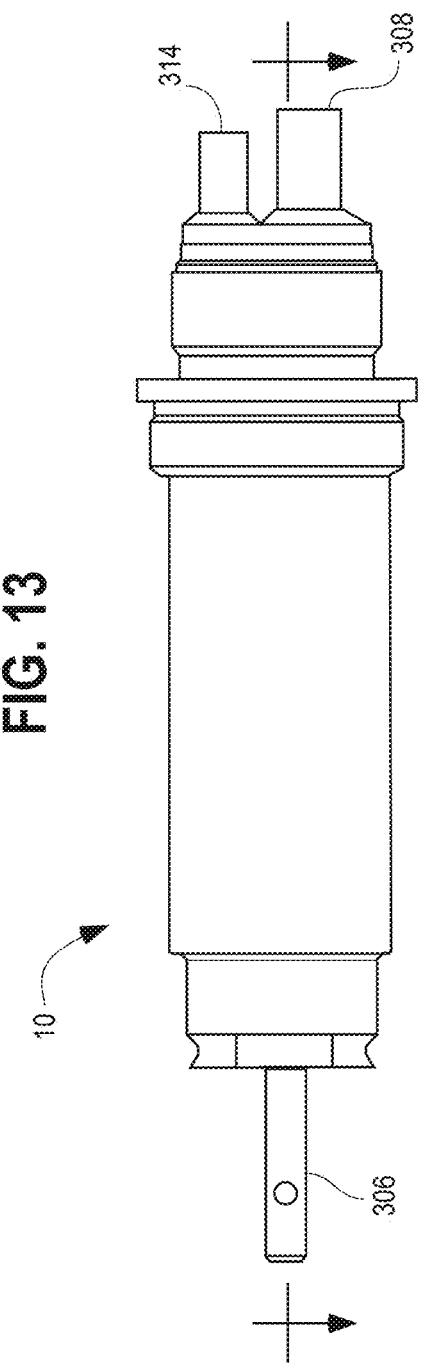
FIG. 13 is a side view of another embodiment of a motor section for a prophylaxis tool handpiece incorporating a positive air pressure feature according to another embodiment of the present disclosure.
Figure 14:
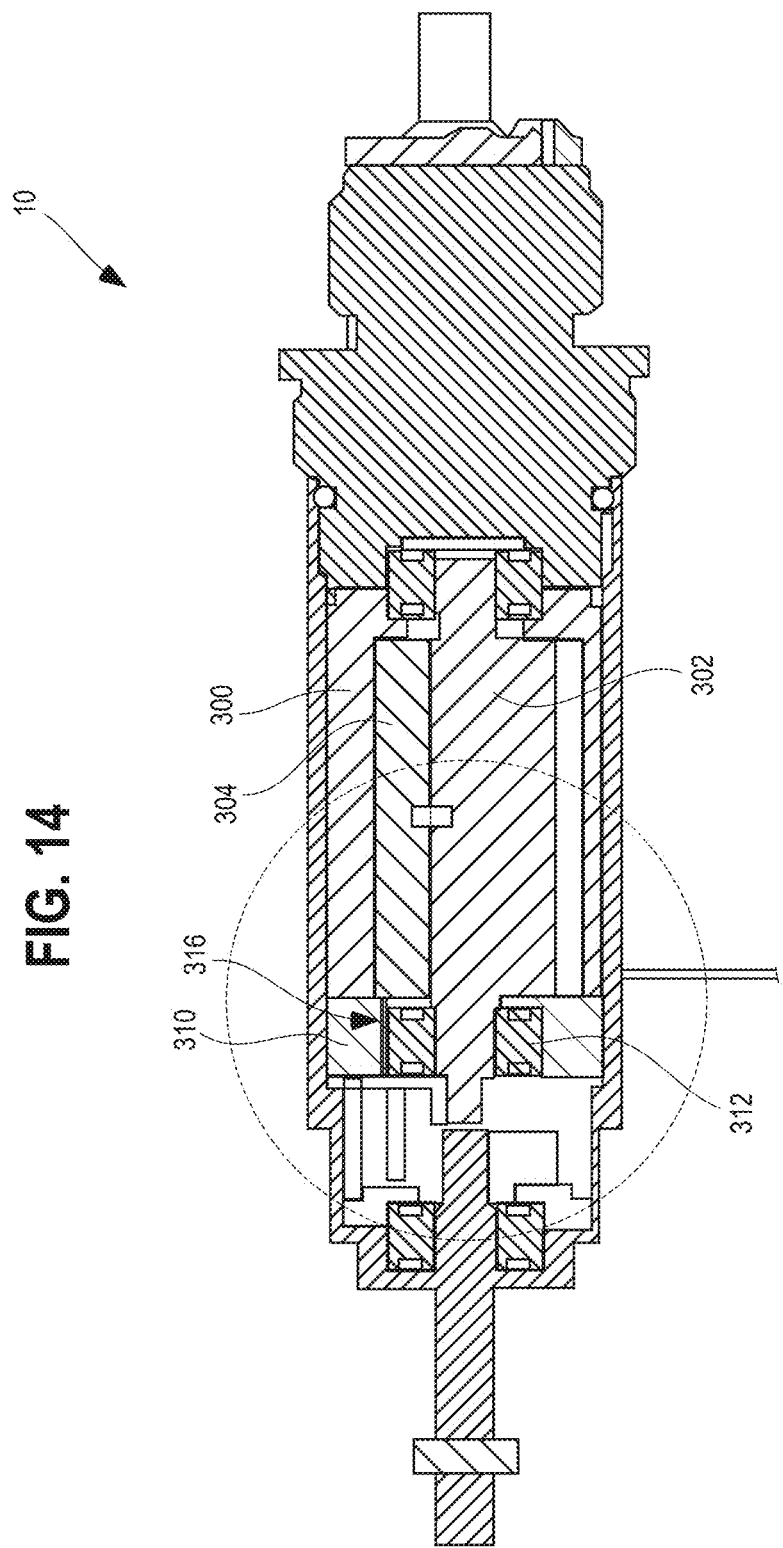
FIG. 14 is a cross-sectional view of the motor section of FIG. 13 taken along the section line B-B.
Figure 15:
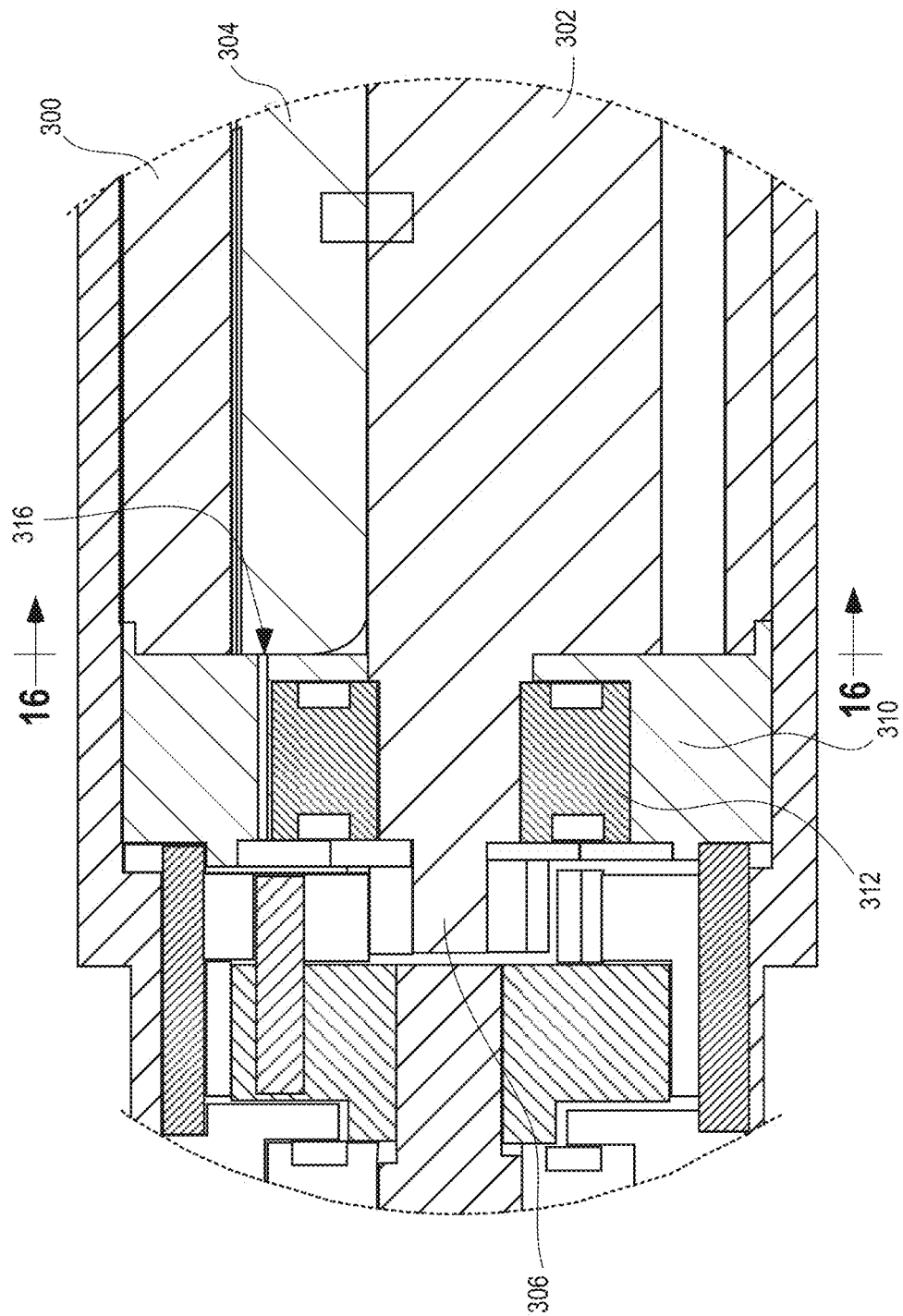
FIG. 15 is a cross-sectional detail view of the distal end of a rotor cartridge in the motor section of FIG. 14.
Figure 16:
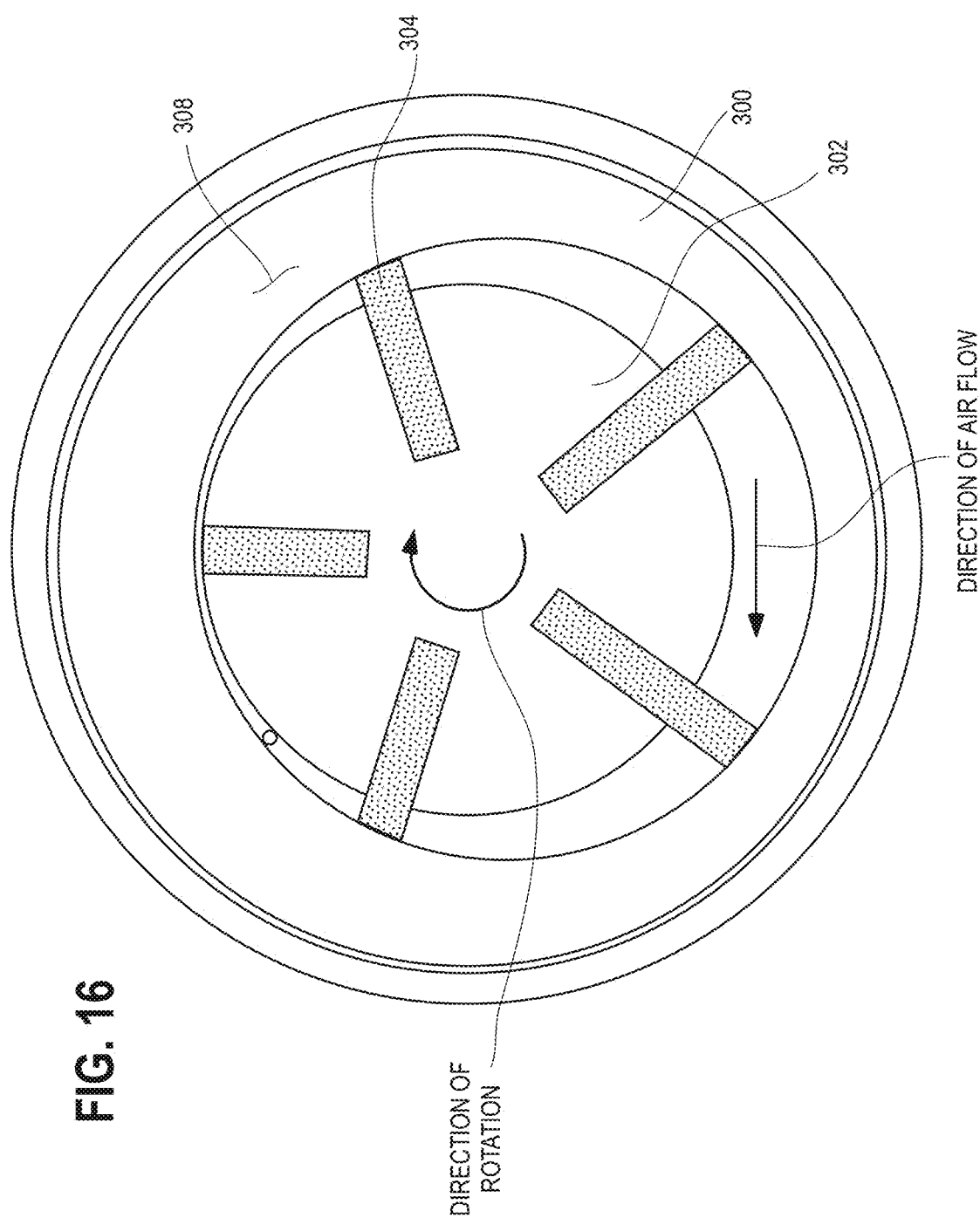
FIG. 16 is an axial section view of the rotor cartridge of the motor section of FIG. 13.

Referring to FIG. 11, the prophylaxis tool handpiece 5 may further include a barrier sleeve 250. The barrier sleeve 250 is preferably a hollow cylindrical member with a first barrier sleeve end 255 and a second barrier sleeve end 260. The barrier sleeve 250 further includes a neck section 265 and shoulder section 270 that transitions from the neck section 265 to the main body of the barrier sleeve 250. The neck section 265 is preferably an annular ring, with a smaller diameter than the diameter of the barrier sleeve 250 and the shoulder section 270. The neck section 265 also includes a band 272 that engages with a groove 274 (shown in FIG. 6 in closer detail) in the circumferential outer surface of the clamp sleeve 125.

The shoulder section 270 includes an indented section 273 that projects slightly into the interior of the barrier sleeve 250. The indented section 273 engages with an annular groove 285 (again shown in more detail in FIG. 6) of the clamp sleeve 125 when the barrier sleeve 250 is positioned over the motor section 10. Embodiments of the barrier sleeve 250 preferably enclose at least a portion of the motor section 10. In other embodiments, the barrier sleeve 250 extends all the way to and even below the proximal end of the motor section 10.

The barrier sleeve 250 also includes a pull tab 275 that extends along the length of the barrier sleeve 250, from the first barrier sleeve end 255 to the second barrier sleeve end 260. The pull tab 275 may be provided with a thinned and weakened line of material on either side that connects the pull tab with the body of the barrier sleeve 250. Preferably, these lines of thinned and weakened material remain solid to maintain a consistent barrier around the sleeve 250. However, these sections of thinned and weakened material also provide convenient tear lines that allow a user to separate the pull tab 275 from the rest of the barrier sleeve 250 with relatively minimal effort in order to facilitate ready removal of the barrier sleeve 250 from the motor section 10 when the user finishes using the device with a patient.

In some embodiments of the present disclosure, the motor section 10 may further include an ozone generator 350. Generation of ozone within the interior of the sleeve section 15 can be an effective method to disinfect that space and kill bacteria and viruses that are able to enter the space. Ozone is able to decay contaminants without harmful environmental residues. Ozone only requires oxygen (or air) and electricity to be generated, and is generated by ionizing the air.

In greater detail, a neutral atom in a strong electric field is ionized to create a positive ion and a free electron. The electric field accelerates the positive ion and free electron in opposite directions, preventing them from recombining and imparting kinetic energy to each of them. Due to the higher charge/mass ratio, the electron is accelerated to a higher velocity than the positive ion. The electron gains enough energy from the field that when it strikes another atom, the electron ionizes it, knocking out another electron, and creating another positive ion. These electrons collide with other atoms, creating further electron/positive-ion pairs. Electrons recombine with positive ions to form neutral atoms. When the electron falls back to its original energy level, it releases a photon of light. The photons serve to ionize other atoms, maintaining the creation of more electron/positive-ion pairs. When the electrons are far enough away from the electric field, the electrons no longer have enough energy to ionize atoms when they collide. Ions are able to recombine with electrodes to become neutral atoms once again.

The ozone generator 350 includes a driven shaft 60 that is rotatably mounted within a bearing (not shown) at the distal end of the housing 58 and is driven by a connection with the drive shaft 306 of the air motor. Driven shaft 60 further includes at least two cavities 65 in which are mounted magnets 80. The cavities 65 and magnets 80 are preferably positioned 180° from each other around the circumference of the shaft 60. Each magnet 80 is configured to sit with its outer surface being flush with the outer diameter of the shaft 60.

The shaft 60 and magnets 80 rotate within an armature 90. The armature 90 is preferably an annular ring sized and shaped so that it can be placed over the driven shaft 60. The armature 90 may also be made from a high temperature plastic such as polyether ether ketone (PEEK) or a polyamide such as DuPont® Vespel®, but may be made from other materials in other embodiments. The armature 90 includes a coil of copper wire (not shown) wrapped around its exterior. The proximal end of the armature 90 is provided with an annular face groove 98 in its bottom surface.

An outer sleeve 105 is preferably made from copper that has been flat rolled into a sleeve shape. A glass tube 95, made from a quartz glass in a preferred embodiment, is configured to fit within the inside diameter of the outer sleeve 105. Further, the distal end of the outer sleeve 105 is configured to engage and fit within the annular face groove 98 of the armature 90. A high temperature adhesive is used to secure the outer sleeve 105 within the face groove 98. A second, inner, flat rolled copper sleeve 100 is configured to fit within the inside diameter of the glass tube 95. An end cap 110 having an annular groove in its top surface is provided at the proximal end of this assembly, and the proximal end of the outer sleeve 105 is secured within the face groove of the end cap 110 with a high temperature adhesive. The wire coil of the armature 90 is connected at one end to the outer sleeve 105 while the opposite end is connected to the inner sleeve 100.

Figure 17:
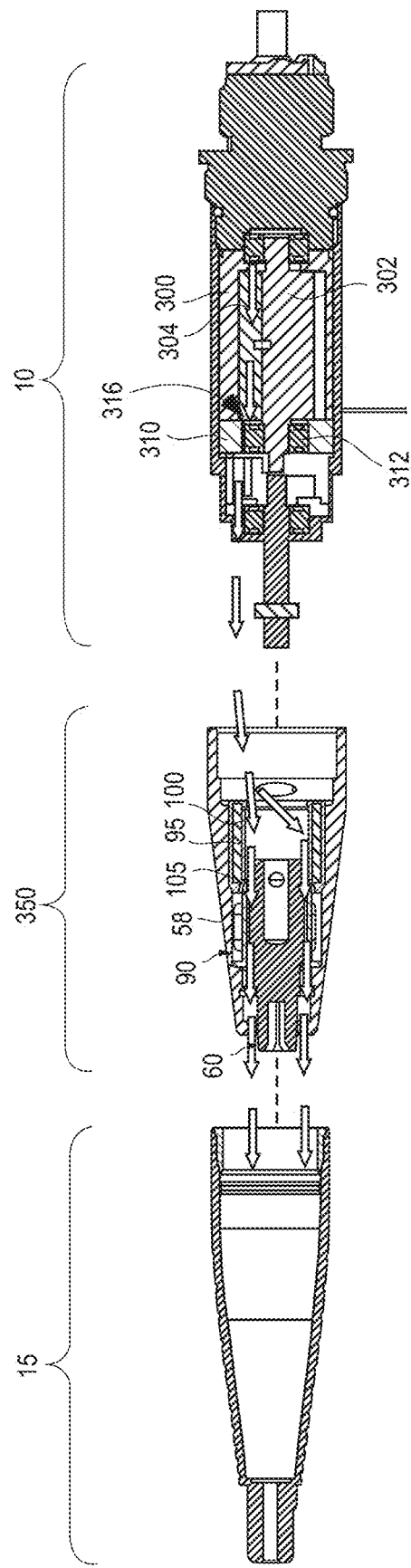
FIG. 17 is an exploded cross-sectional view of the motor section, ozone generator, and sleeve illustrating the flow of air therethrough according to an embodiment of the present disclosure.

Air flowing from the air motor 10 is ionized within the ozone generator 350 and is forced into the interior space within the sleeve 15. The flow of air through the ozone generator is more effectively produced in conjunction with the positive air pressure feature described above. In embodiments featuring both the ozone generator 350 and the positive air pressure feature as depicted in FIG. 17, the air passage 316 directs air to the ozone generator 350 before it flows to the space between the sleeve section 15 and motor section 10, as represented by the arrows passing through the components in FIG. 17.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A dental prophylaxis tool handpiece comprising:
a motor section having a first connector and wherein the motor section further comprises an air driven motor having a rotor section and an air inlet in communication with a source of pressurized air;
a sleeve section having a second connector and at a first end extending over at least a portion of the motor section and further configured to engage a prophylaxis tool at a second end of the sleeve section, wherein after engagement of the sleeve section with the motor section and with a prophylaxis tool section, walls of the sleeve section define a generally closed interior space surrounding the portion of the motor section;
wherein the first and second connector are each configured for engagement with each other, such engagement being further configured to limit relative axial movement of the sleeve section relative to the motor section while allowing for rotational movement of the sleeve section relative to the motor section; and
wherein upon engagement of the sleeve section with the motor section, the walls of the sleeve section substantially isolate the portion of the motor section from contaminants; and
wherein the motor section further includes an air passage in fluid communication with the rotor section and wherein the air passage is in fluid communication with and terminates at the generally closed interior space and is configured to provide a conduit for pressurized air to pass from the rotor section into the generally closed interior space and create higher than atmospheric pressure within the entire generally closed interior space.

2. The dental prophylaxis tool handpiece as set forth in claim 1, wherein the first connector comprises:
a clamp sleeve engaged with the motor section and having an exterior circumferential groove; and
a split ring configured for expansion and contraction of a diameter thereof and further configured to fit within the exterior circumferential groove.

3. The dental prophylaxis tool handpiece as set forth in claim 2, wherein the second connector comprises an interior circumferential groove configured to accept the split ring of the first connector.

4. The dental prophylaxis tool device as set forth in claim 2, wherein the clamp sleeve is permanently connected with the motor section.

5. The dental prophylaxis tool handpiece as set forth in claim 3, wherein the second connector comprises an outer sleeve and an inner sleeve and wherein the interior circumferential groove is located on an interior surface of the inner sleeve.

6. The dental prophylaxis tool handpiece as set forth in claim 5, wherein the outer sleeve and inner sleeve are separate from one another and permanently or removably engaged with one another.

7. The dental prophylaxis tool handpiece as set forth in claim 1, further comprising a disposable barrier sleeve removably disposed around at least a portion of the motor section.

8. The dental prophylaxis tool handpiece as set forth in claim 7, wherein the disposable barrier sleeve further comprises a removable tear strip.

9. The dental prophylaxis tool handpiece as set forth in claim 1, further comprising an ozone generator in fluid communication with pressurized air in the rotor section and in fluid communication with the interior space, the ozone generator configured to ionize pressurized air passing through the ozone generator and into the generally closed interior space.

10. A dental prophylaxis tool handpiece comprising:
a motor section having a first connector and wherein the motor section further comprises an air driven motor having a rotor section and an air inlet in communication with a source of pressurized air;
a sleeve section having a second connector and at a proximal end extending over at least a portion of a distal end of the motor section and further configured to engage a prophylaxis tool at a distal portion of the sleeve section, wherein after engagement of the sleeve section with the motor section and with a prophylaxis tool section, walls of the sleeve section define a generally closed interior space surrounding the portion of the motor section;
wherein the first and second connector are each configured for engagement with each other, such engagement being further configured to limit relative axial movement of the sleeve section relative to the motor section while allowing for free rotational movement of the sleeve section relative to the motor section;

wherein upon engagement of the sleeve section with the motor section and with a prophylaxis tool section, the walls of the sleeve section substantially isolate the portion of the motor section from contaminants;

wherein the motor section includes an air driven motor having a rotor section and an air inlet in communication with a source of pressurized air;

wherein the motor section further includes an air passage in fluid communication with the rotor section and wherein the air passage is in fluid communication with and terminates at the generally closed interior space and is configured to provide a conduit for pressurized air to pass from the rotor section to the generally closed interior space and create higher than atmospheric pressure within the entire generally closed interior space; and an ozone generator in fluid communication with pressurized air in the rotor section and with the interior space, the ozone generator configured to ionize pressurized air passing into the ozone generator.

\* \* \* \* \*